UNITED STATES PATENT OFFICE.

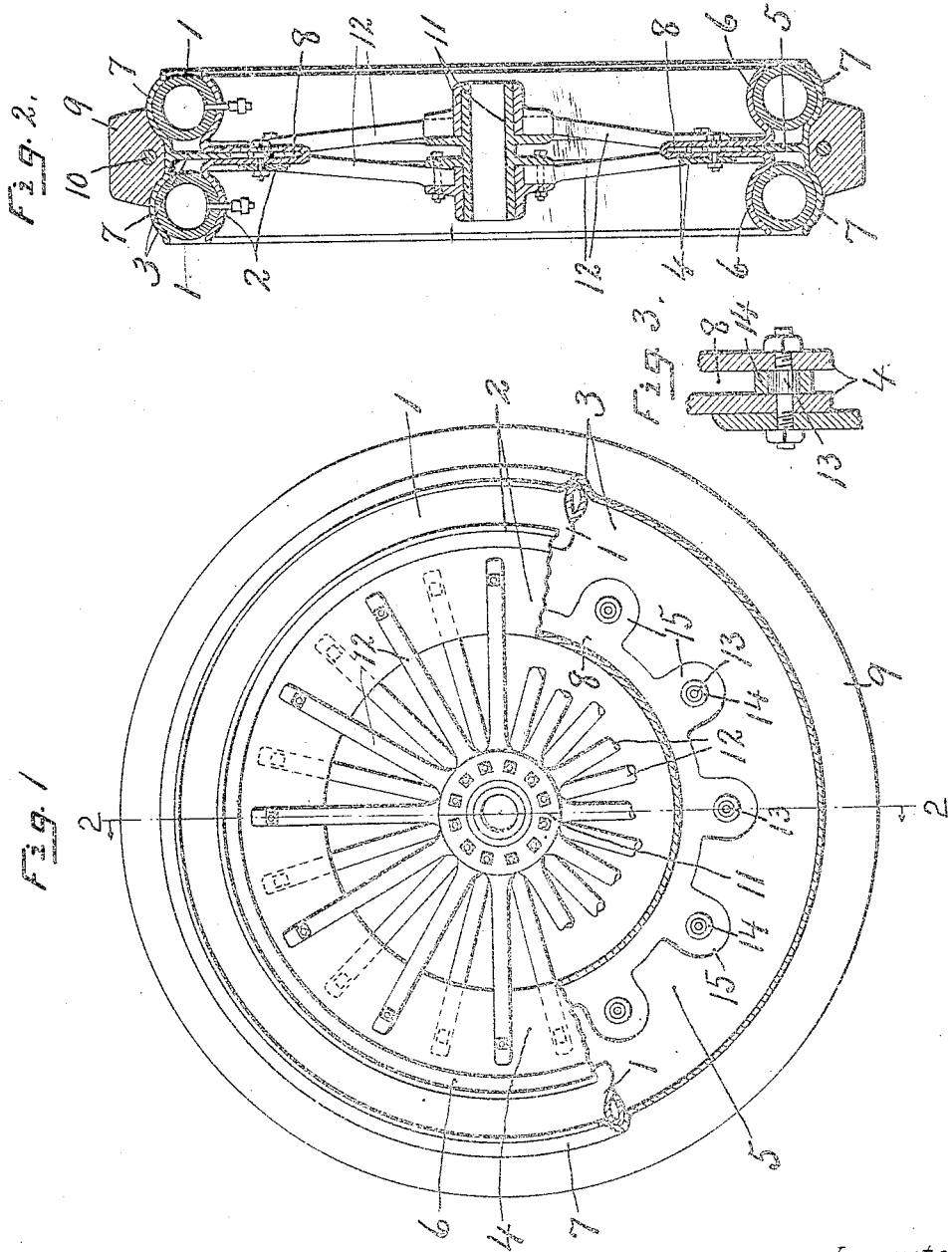

WILLIAM B. McFADDEN, OF SYRACUSE, NEW YORK.

VEHICLE-WHEEL.

1,056,109.

Specification of Letters Patent.

Patented Mar. 18, 1913.

Application filed September 15, 1910. Serial No. 582,206.

*To all whom it may concern:*

Be it known that I, WILLIAM B. McFADDEN, of Syracuse, in the county of Onondaga, in the State of New York, have invented new and useful Improvements in Vehicle-Wheels, of which the following, taken in connection with the accompanying drawings, is a full, clear, and exact description.

This invention relates to certain improvements in vehicle wheels for automobiles and other carriages in which a certain degree of resiliency is required between the tread and hub of the wheel to relieve the running gear from excessive shock or vibration.

It is well known that in the action of the usual pneumatic tire comprising an inner inflatable tube and outer shoe or casing, the continued flexing action of opposite sides of the tire between the tread and rim soon causes molecular disintegration and consequent weakening of these portions of the shoe or casing to such an extent as to be incapable of resisting air pressure from within and resulting in frequent blowouts or bursting of the tire while the tread portion may be still intact. In addition to this, these pneumatic tires are always exposed to excessive injury by wear and puncture so that their use becomes one of the most expensive and troublesome items in the up-keep of the machine.

The main object of my invention is to provide a commercially practicable vehicle wheel with pneumatic resilience disposed in such manner as to avoid excessive wear or liability to puncture and at the same time having all of the advantages of resiliency and flexibility of the usual pneumatic tire.

Another object is to permit the use of single tube inflatable pneumatics of considerably smaller cross sectional diameter than the usual shoe and to arrange such pneumatics at opposite sides of the longitudinal center of the tire proper so as to afford a broader pneumatic bearing laterally and reduce the liability to disintegration by continued flexing action.

Other objects and uses relating to the specific parts of the wheel will be brought out in the following description.

In the drawings, Figure —1— is a side elevation, partly broken away of a vehicle wheel embodying the various features of my invention. Fig. —2— is a transverse sectional view of the same wheel taken on line —2—2 Fig. —1—. Fig. —3— is an enlarged sectional view of portions of the webs of the rims between which the pneumatic tubes are located showing particularly the means for clamping the spokes to the web of the inner rim.

In carrying out the object stated, a pair of annular pneumatic tubes —1— of substantially the same size and form are interposed side by side between inner and outer annular rims —2— and —3— which are movable radially relatively to each other but are normally held in concentric relation by the inflation of the tubes —1—. These rims —2— and —3— are of substantially the same width, sufficient to receive and retain the tubes —1— side by side and are preferably provided with central inwardly projecting annular flanges or webs —4— and —5— and opposite laterally projecting concavo-convex flanges —6— and —7— having their concave sides facing each other to form seats for receiving and retaining the tubes —1— in operative position, leaving sufficient intervening space between the laterally projecting flanges for the relative radial movement of the rims under flexing action of the pneumatic tubes. These rims are preferably made of rolled steel or other suitable material, the web —4— being provided with an annular slot or groove —8— while the web —5— preferably consists of a single thickness of metal and projects inwardly into the annular groove —8—, thereby forming radially sliding interlocking connections between the rims and preferably midway between the tubes —1— to permit relative radial movement of said rims and at the same time prevent their relative lateral movement.

The central portion of the outer rim —3— between the lateral flanges —7— is depressed to form an annular groove in which is seated a tire —9— of solid rubber or any other suitable material. When the tire —9— is made of solid rubber which is preferable, it may be continuous and held in place by its entrance into the annular recess or groove in the center of the outer rim —7— or may be additionally retained by means of a circular wire —10— passed therethrough and around the periphery of the groove in which the tire is seated in a manner similar to that by which solid tires are attached to ordinary wagon wheels.

The web —4— of the inner rim —2— may be connected to any suitable construction of hub as —11— by any suitable form of spokes as —12—.

The opposite walls of the slot —3— of the flange or web —4— are secured together and held a fixed distance apart by stay-bolts —13— which also serve as securing means for the adjacent ends of the spokes —12—, the portions of the bolts —13— within the groove —3— being enlarged to form shoulders whereby the sides of the slot are held against inward movement to permit free radial play of the flange —5— in said slot. Journaled upon these enlargements of the bolts are rollers —14— of any suitable material to prevent friction between the flange —5— and said plates. This flange —5— extends inwardly some distance beyond the said bolts and in order that it may have free radial action, its inner edge is provided with recesses —15— registering with but considerably larger than the diameter of the rollers as best seen in Fig. —1— to allow movable radial play of the outer rim —5— under the flexing action of the pneumatic tubes —1—. These pneumatic tubes may be inflated with air or other fluid through suitable valves —16— shown more clearly in Fig. —2—.

It is now clear that when the wheel is adjusted for use and the pneumatic tubes —1— inflated the rims —2— and —3— will be substantially concentric and will be free to move radially under the resilient action of the tubes when a load is applied to such wheels or when passed over uneven surfaces in the road-bed. It is also apparent that the location of the pneumatic tubes at opposite sides of the longitudinal center of the tire affords a considerable broader lateral bearing than would be possible with a single tube, thereby relieving the tubes from excessive lateral strains when traveling over transversely inclined roadbeds and permitting the use of comparatively small tubes, the combined cross sectional area of which will be considerably greater than that of the ordinary pneumatic tire and will therefore support a greater load without overstraining the tubes by excessive inflation.

What I claim is:

A vehicle wheel comprising a one-part inner rim including a pair of annular bearings substantially concavo-convex in cross section and each having its inner end terminating in an inwardly-extending flange, said flanges spaced from each other and formed integral with one another at their inner ends, spacing members between said flanges, anti-friction rollers journaled upon said members, a one piece outer rim surrounding the inner rim and including an intermediate portion and an annular bearing projecting from each side of said intermediate portion and substantially concavo-convex in transverse section, said outer rim further including an integral inwardly-extending annular flange projecting from said intermediate portion and extending between and slidably connected to the flanges of the inner rim, said annular flange of the inner rim having recesses in its inner periphery adapted for the reception of said rollers, the bearings of the outer rim opposing the bearings of the inner rim, and a pair of pneumatic tubes interposed between and engaged by said bearings, a hub, and means for connecting the flanges of the inner rim to said hub.

In witness whereof I have hereunto set my hand on this 10th day of September 1910.

WILLIAM B. McFADDEN.

Witnesses:
H. E. CHASE,
E. F. SPEARING.